Figure 1:
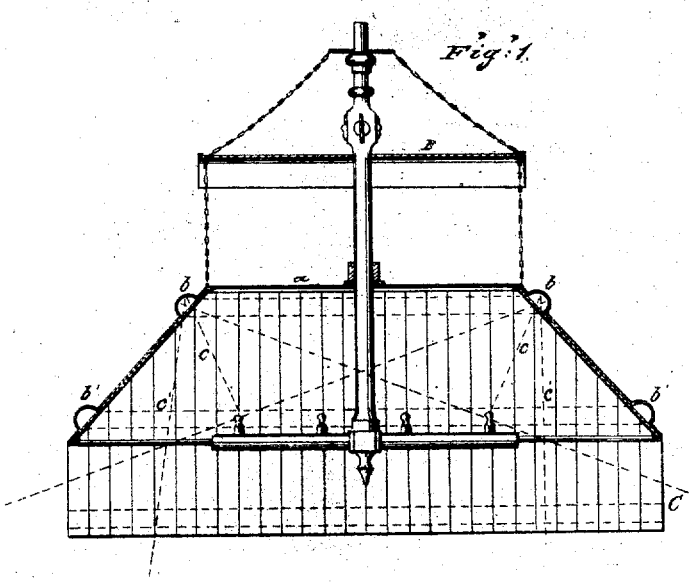

I. P. FRINK.

Reflector.

No. 3,827. Reissued Feb. 8, 1870.

Witnesses:
Albert L. Hodge.
T. B. Beecher

Inventor:
Isaac P. Frink.

UNITED STATES PATENT OFFICE.

ISAAC P. FRINK, OF NEW YORK, N. Y.

IMPROVEMENT IN REFLECTORS.

Specification forming part of Letters Patent No. 1,249, dated April 17, 1860; reissue No. 146, dated December 24, 1861; reissue No. 3,827, dated February 8, 1870.

DIVISION B.

*To all whom it may concern:*

Be it known that I, ISAAC P. FRINK, of New York, in the county and State of New York, have invented a certain new and useful Improvement in Reflectors for Gas and other Lights; and I hereby declare that the following is a full, clear, and exact description thereof, reference being had to the drawing which accompanies and forms a part of this specification.

Figure 2:
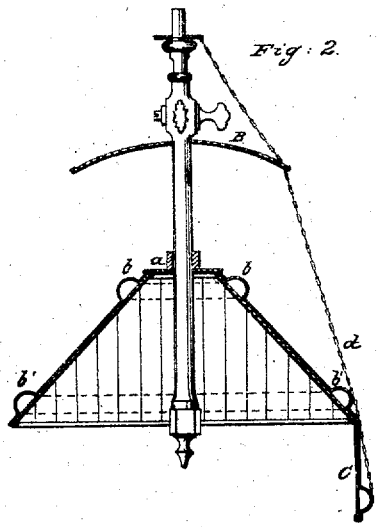

Of this drawing, Figure 1 is a longitudinal vertical section of one of my improved reflectors, showing a gas-pipe and burners in elevation; and Fig. 2 is an end or side transverse section of the same reflector taken at right angles to Fig. 1.

Similar letters in the two figures denote similar parts.

In reissued Letters Patent bearing even date herewith I have described and claimed several improvements made by me in reflectors of that class in which the illuminating rays are thrown down beneath the flame or source from which they proceed; and the invention here patented consists of a special form and mode of construction of reflectors of this class, which are designed for certain particular uses, such, for example, as the windows of stores, or for picture-galleries and other situations in which the reflector is required to be of considerable length.

In the drawing, A represents the body of the reflector, which may be made of tinned sheet-iron or of any other suitable substance. It should be lined or covered on the inside with glass or other diaphanous material, which may be either corrugated, or plain, or figured on its surface, though it is represented in the drawing as corrugated, which is the mode in which I prefer to construct it. The form of the body of the reflector is that of an oblong truncated pyramid, the sides of which should preferably incline in an angle of about forty-five degrees, and an aperture or open space, *a*, is provided in the top, to furnish the requisite draft to the flame and to permit of ventilation. The sides of the reflector may be perfect planes, or they may be concave on their inner surface, if desired.

It is obvious that when reflectors are used in the show-windows of stores, or in picture-galleries and other similar situations, or over billiard-tables, it is necessary either that there should be more than one of them, thereby increasing the expense and interfering with the convenient distribution of the light; or, if only one reflector be employed, that it should be of considerable length, in order to properly throw down and concentrate the light upon a comparatively narrow but elongated space between the burners, in the manner required for such uses. It is this necessity which makes material the above-described oblong truncated pyramidal form which I have adopted for my improved reflector, because if the reflector be circular or conical, or if its shape be that of a numerously-sided polygon, while the space to be lighted is, as in the situations above mentioned, narrow but comparatively long or extended, most of the illuminating rays which fall outside of or beyond the breadth of this narrow space will produce but slight effect. With my form of reflector, however, all the rays will be utilized to the maximum degree. And this will be the case even although the extreme ends of the reflector, instead of being of a true pyramidal section, are divided up into two or more sub-sections—that is to say, are polygonal—while the long sides of the reflector are pyramidal, a form which may be adopted when preferred.

The object of the lining of glass or other equivalent material is to increase the reflection of the light, and to prevent the metallic surface of the reflector from becoming scratched or tarnished, which would greatly impair if not destroy its reflecting power.

Figure 3:
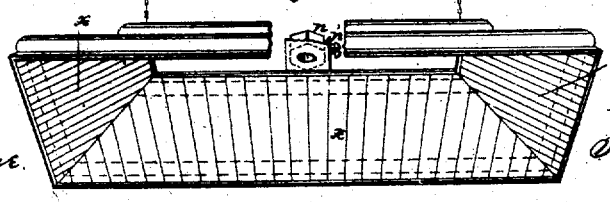

It will be observed, by inspecting the drawing, Fig. 3, that the glass which constitutes the lining or covering of the reflector is made and attached in several strips, sections, or panels, *x x x*, throughout the area of the inner surface of the reflector, instead of being applied by molding or blowing the glass, to correspond in figure with that of the reflector. This method of construction answers a very important purpose, inasmuch as if the glass lining was put on in a single piece, by being molded or blown to fit the reflector, great difficulty would be found in fitting it with sufficient accuracy and tightness, especially if the reflector be large, and skillful and expensive labor would be required for the work; and when fitted, the glass would not have proper freedom to expand and retract without danger of breaking it, which would make the reflector nearly or quite worthless; and it would render the reflector, especially if it be large, so stiff and rigid that it could not be handled or transported without great liability to break or crack the glass. But by my mode of inserting the glass in sections or panels, the evils are avoided, the different sections or panels can be rapidly put in place and secured, the requisite expansion and contraction provided for, and if any of the sections or panels break they can at once be easily and cheaply replaced by others, while the reflector is rendered so yielding and so free from undue rigidity that it can be moved or handled without any danger of cracking the glass. Difficulty frequently occurs, in practice, in fastening the reflector-body so that it shall be firmly and rigidly secured to the gas-tube or other support, and yet be capable of being quickly and readily detached therefrom, when required. To overcome this in my improved reflector I put a narrow cross-bar or string-piece, *f*, of metal, across the aperture or opening *a* of the reflector, and solder, rivet, or otherwise secure its ends strongly to the sides of the latter. In this string-piece a hole is made for the gas-pipe to pass through when the reflector is being placed in position, and I solder or otherwise firmly fasten a nut, *n*, either to the upper or under surface of the string-piece. This nut has a hole in it corresponding to that in the string-piece, and after the pipe has been passed through the string-piece and nut the set-screw *n'* is screwed up, thereby enabling the reflector to be secured to the pipe at any desired point, with perfect firmness and rigidity.

Having fully described my invention, what I claim, and desire to secure by Letters Patent, is—

1. A reflector which is in the form of an oblong truncated pyramid, and which is lined with glass or other diaphanous material, substantially as and for the purposes shown and described.

2. The combination, with the metallic body of a reflector, of a glass covering or lining therefor, applied in sections or panels, substantially as and for the purposes described.

3. The combination, with the body of a reflector, of a cross-bar or string-piece, or its equivalent, provided with a nut and set-screw, the whole arranged and operating substantially as set forth.

ISAAC P. FRINK.

Witnesses:
T. B. BEECHER,
M. M. LIVINGSTON.